US012134987B2

United States Patent
Jakab et al.

(10) Patent No.: US 12,134,987 B2
(45) Date of Patent: Nov. 5, 2024

(54) EXHAUST BAFFLE COMPONENT FOR AN AIR TURBINE STARTER ASSEMBLY

(71) Applicant: Hamilton Sundstrand Corporation, Charlotte, NC (US)

(72) Inventors: Thomas Jakab, Lake Geneva, WI (US); Jeffrey Todd Roberts, Winnebago, IL (US); Adrian L. Stoicescu, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/205,242

(22) Filed: Mar. 18, 2021

(65) Prior Publication Data

US 2021/0301726 A1    Sep. 30, 2021

Related U.S. Application Data

(60) Provisional application No. 63/000,063, filed on Mar. 26, 2020.

(51) Int. Cl.
*F02C 7/277* (2006.01)
*F01D 25/24* (2006.01)
*F02C 7/27* (2006.01)

(52) U.S. Cl.
CPC ............ *F02C 7/277* (2013.01); *F01D 25/243* (2013.01); *F02C 7/27* (2013.01);
(Continued)

(58) Field of Classification Search
CPC ... F02C 7/277; F02N 7/08; F02N 7/12; F01D 25/30; F01D 21/045; F01D 17/14–167;
(Continued)

(56) References Cited

U.S. PATENT DOCUMENTS 1,802,329 A    4/1931    Birmann
4,074,914 A  *  2/1978  Novotny ................ F16L 23/02
                                                                415/214.1
(Continued)

FOREIGN PATENT DOCUMENTS

EP    3587746 A1    1/2020
GB    2144804 A  *  3/1985  ............ F01D 25/18

OTHER PUBLICATIONS

Extended European Search Report for International Application No. 21164331.7 dated Jul. 23, 2021, 51 pages.
(Continued)

*Primary Examiner* — Stephanie Sebasco Cheng
(74) *Attorney, Agent, or Firm* — CANTOR COLBURN LLP (57) ABSTRACT

An exhaust baffle component for an aircraft starter includes a plurality of frames arranged with one another as a single component. At least one of the plurality of frames may include an attachment flange extending therefrom and defining a receiving aperture. Each frame of the plurality of frames may include one or more louvers stacked relative to one another and spaced from one another to define an air opening therebetween. The attachment flange may extend from the frame at a substantially central region of an upper portion of the frame to substantially align the receiving aperture with a starter aperture of a starter component to facilitate securement of the attachment flange to the starter component.

7 Claims, 9 Drawing Sheets

(52) U.S. Cl.
CPC .. *F05D 2220/323* (2013.01); *F05D 2240/126* (2013.01); *F05D 2260/38* (2013.01); *F05D 2260/85* (2013.01)

(58) Field of Classification Search
CPC .. F01D 9/02; F01D 9/04–048; F05D 2250/52; F05D 2260/31; F05D 2260/36–38; F02K 1/54–766
See application file for complete search history.

(56) References Cited

U.S. PATENT DOCUMENTS

| | | | |
|---|---|---|---|
| 4,391,564 A | 7/1983 | Garkusha et al. | |
| 5,203,674 A | 4/1993 | Vinciguerra | |
| 5,813,828 A | 9/1998 | Norris | |
| 6,231,304 B1 | 5/2001 | Andersson | |
| 6,533,546 B2 | 3/2003 | Kreitmeier | |
| 6,814,539 B2 | 11/2004 | Farnsworth et al. | |
| 7,980,055 B2 | 7/2011 | Lindenfeld | |
| 8,133,017 B2 | 3/2012 | Schott et al. | |
| 8,376,700 B2 * | 2/2013 | Le Saint | F02C 7/277 415/214.1 |
| 8,506,235 B2 * | 8/2013 | Norem | F02C 7/277 415/121.2 |
| 8,522,521 B2 * | 9/2013 | Dyer | F02C 7/32 60/788 |
| 8,757,969 B2 | 6/2014 | Pruthi et al. | |
| 9,217,368 B2 | 12/2015 | Myoren et al. | |
| 9,989,030 B2 * | 6/2018 | Golden | F01D 17/162 |
| 2003/0017045 A1 | 1/2003 | Telakowski | |
| 2004/0091350 A1 | 5/2004 | Graziosi et al. | |
| 2010/0192594 A1 | 8/2010 | Le Saint | |
| 2010/0239418 A1 | 9/2010 | Schott et al. | |
| 2012/0042659 A1 | 2/2012 | Zawilinski et al. | |
| 2012/0063893 A1 | 3/2012 | Pruthi et al. | |
| 2012/0114475 A1 | 5/2012 | Norem | |
| 2018/0298785 A1 | 10/2018 | Kim | |
| 2019/0032562 A1 | 1/2019 | Fiste et al. | |
| 2020/0003072 A1 | 1/2020 | Zawilinski et al. | |
| 2021/0262365 A1 | 8/2021 | Yamashita et al. | |
| 2022/0018287 A1 | 1/2022 | Jakab et al. | |

OTHER PUBLICATIONS

Extended European Search Report for International Application No. 21164706.0 dated Jul. 23, 2021, 8 pages.
US Non-Final Office Action for U.S. Appl. No. 17/205,217, Dated Jul. 14, 22, 35 pages.
EPO Official Letter for Application No. 21164331.7, mailed Jul. 20, 2023, 4 pages.
Notice of Allowance for U.S. Appl. No. 17/205,217, Dated May 2, 2023, 10 pages.
US Final Office Action for U.S. Appl. No. 17/205,217, Dated Feb. 17, 2023, 13 pages.

* cited by examiner

EXHAUST BAFFLE COMPONENT FOR AN AIR TURBINE STARTER ASSEMBLY

CROSS-REFERENCE TO RELATED APPLICATIONS

This application claims priority to U.S. Provisional Application No. 63/000,063 filed Mar. 26, 2020, the contents of which are incorporated herein by reference in their entirety.

BACKGROUND

Exemplary embodiments pertain to the art of starter assemblies for engines, such as gas turbine engines and, more particularly, to exhaust baffle components to assist in directing airflow within a starter assembly of the engine.

Many relatively large gas turbine engines, including turbofan engines, may use an air turbine starter (ATS) to initiate gas turbine engine rotation. The ATS is typically mounted on an accessory gearbox which, in turn, is mounted on the engine or airframe. Consequently, the ATS is installed in the aircraft at all times even though active operation may occur only for a minute or so at the beginning of each flight cycle, along with occasional operation during engine maintenance activities.

The ATS generally includes a turbine section coupled to an output section within a housing. The turbine section is coupled to a high pressure fluid source, such as compressed air, to drive the output section through a gear system. Thus, when the high pressure fluid source impinges upon the turbine section, the output section powers the gas turbine engine. The ATS generally includes an exhaust baffle downstream of the turbine section.

Current exhaust baffle assemblies for engine starters mount each of several individual baffles in parallel with a mounting face of an engine. Such assemblies include many components such as spacers between the individual baffles and are labor intensive to assemble. Further, due to the many components and assembly challenges, the baffle component of the starter assembly may experience cracking during use.

BRIEF DESCRIPTION

According to some embodiments, exhaust baffle assemblies for a turbine starter are provided. The baffles are configured to assist in directing airflow within a started assembly of an engine. The baffle includes a plurality of frames arranged with one another as a single component. At least one of the plurality of frames includes an attachment flange extending therefrom and defining a receiving aperture. In addition, each frame of the plurality of frames includes one or more louvers stacked relative to one another and spaced from one another to define an air opening therebetween. The attachment flange may extend from the frame to substantially align the receiving aperture with a starter aperture of a starter component to facilitate securement of the attachment flange to the starter component.

In addition to one or more of the features described above, or as an alternative, in further embodiments of the baffle, at least one of the plurality of frames, the attachment flange, and a fastener may be inserted within the receiving aperture to secure the attachment flange to the starter component.

In addition to one or more of the features described above, or as an alternative, in further embodiments of the baffle, each frame of the plurality of frames may define an opening and each of the one or more louvers may be mounted to one frame of the plurality of frames and extend across a respective opening.

In addition to one or more of the features described above, or as an alternative, in further embodiments of the baffle, each frame of the plurality of frames may be connected to at least two adjacent frames to define a substantially circular shape about a central axis defined by the starter component. Each louver of the one or more louvers may be arranged with one another in a stack such that each louver of the one or more louvers does not overlap another louver relative to an airflow path extending through the exhaust baffle component.

In addition to one or more of the features described above, or as an alternative, further embodiments of the baffle, may include an air channel extending from a first location proximate the central axis to a second location proximate to at least one of the plurality of frames.

In addition to one or more of the features described above, or as an alternative, in further embodiments of the baffle, each of the one or more louvers may be stacked vertically relative to an upper axis defined by the upper portion of the frame.

In addition to one or more of the features described above, or as an alternative, in further embodiments of the baffle, each louver of the one or more louvers may be spaced from an adjacent one of the one or more louvers such that air may flow therebetween.

In addition to one or more of the features described above, or as an alternative, further embodiments of the baffle, may include an extension of a flexible material extending from a lower portion of each frame of the plurality of frames. The extension may define one or more openings sized to facilitate a snap fit to a feature of a housing of the starter component.

In addition to one or more of the features described above, or as an alternative, further embodiments of the baffle, may include an extension extending from a lower portion of each of the plurality of frames in a direction substantially perpendicular to a central axis defined by the starter component.

In addition to one or more of the features described above, or as an alternative, in further embodiments of the baffle, each frame of the plurality of frames may be arranged with respective louvers of the one or more louvers such that a continuous airflow path is defined from an interior of the starter component to an exterior of the starter component without contacting one of the one or more louvers.

According to some embodiments, an engine starter assembly is provided. The engine starter assembly includes a gear box and a starter assembly coupled to the gearbox. The starter assembly includes a baffle component formed as a single component and an attachment flange with a receiving aperture sized to receive a fastener to secure the attachment flange to the starter assembly. The attachment flange may extend from a substantially central region of an upper portion of a frame of the baffle component such that a force from a fastener inserted in the receiving aperture is oriented substantially perpendicular to a direction of airflow entering the baffle component.

In addition to one or more of the features described above, or as an alternative, in further embodiments of the starter assembly, the baffle component may include a plurality of the attachment flanges arranged with one another about a first center axis and each attachment flange of the plurality of attachment flanges is sized such that each of the receiving apertures is spaced substantially at the same distance from the first center axis.

In addition to one or more of the features described above, or as an alternative, in further embodiments of the starter assembly, the baffle component may include one or more louvers and each louver may define a corner. In addition, an exhaust axis may be defined extending perpendicularly from a central axis defined by the starter assembly to the corner. A length may be defined between the exhaust axis and an upper edge of an exhaust opening defined by the baffle component.

In addition to one or more of the features described above, or as an alternative, in further embodiments of the starter assembly, the baffle component may include a plurality of frames arranged with one another to define a substantially circular shape.

In addition to one or more of the features described above, or as an alternative, in further embodiments of the starter assembly, the baffle component may include an extension extending from a lower portion of the frame. In addition, the extension and the attachment flange may extend along separate axes oriented substantially parallel to one another.

In addition to one or more of the features described above, or as an alternative, in further embodiments of the starter assembly, the assembly may further include a housing and the extension may define one or more grip openings each sized to engage with a feature of the housing.

In addition to one or more of the features described above, or as an alternative, further embodiments of the starter assembly, the assembly may further include a plurality of louvers each extending across an exhaust opening defined by the frame. In addition, each louver of the plurality of louvers may be oriented at an angle substantially between zero and ninety degrees.

In addition to one or more of the features described above, or as an alternative, in further embodiments of the starter assembly, each louver of the plurality of louvers may be stacked relative to one another without a spacer between adjacent louvers.

In addition to one or more of the features described above, or as an alternative, in further embodiments of the starter assembly, each louver of the plurality of louvers may be stacked relative to one another in a non-overlap relationship.

In addition to one or more of the features described above, or as an alternative, in further embodiments of the starter assembly, the assembly may define a central axis. In addition, the starter assembly may define an air channel extending from a first location proximate the central axis to a second location proximate to the baffle component.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
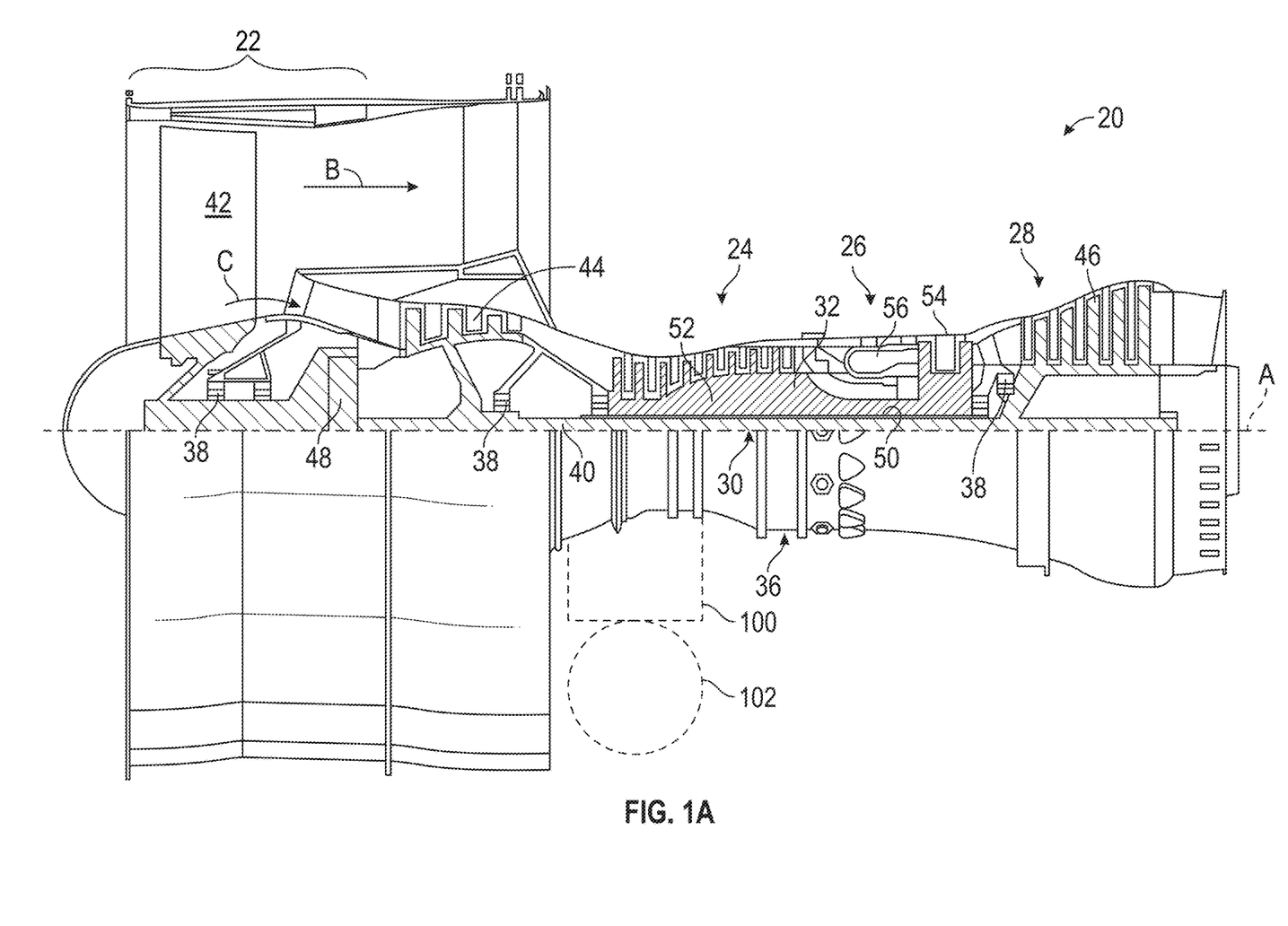
FIG. 1A is a side view, in partial cross-section, of an example of a gas turbine engine including a gear box and a starter assembly.

FIG. 1A schematically illustrates an example of a gas turbine engine 20. The gas turbine engine 20 includes a fan section 22, a compressor section 24, a combustor section 26, and a turbine section 28. Each of the fan section 22, the compressor section 24, the combustor section 26, and the turbine section 28 is arranged with one another to define an engine central longitudinal axis A In some cases, a gear box 100 may be mounted to a housing of the gas turbine engine 20 at a location adjacent one of the compressor section 24, the combustor section 26, or the turbine section 28 to facilitate mechanical communication between the engine and the gearbox.

Figure 1B:
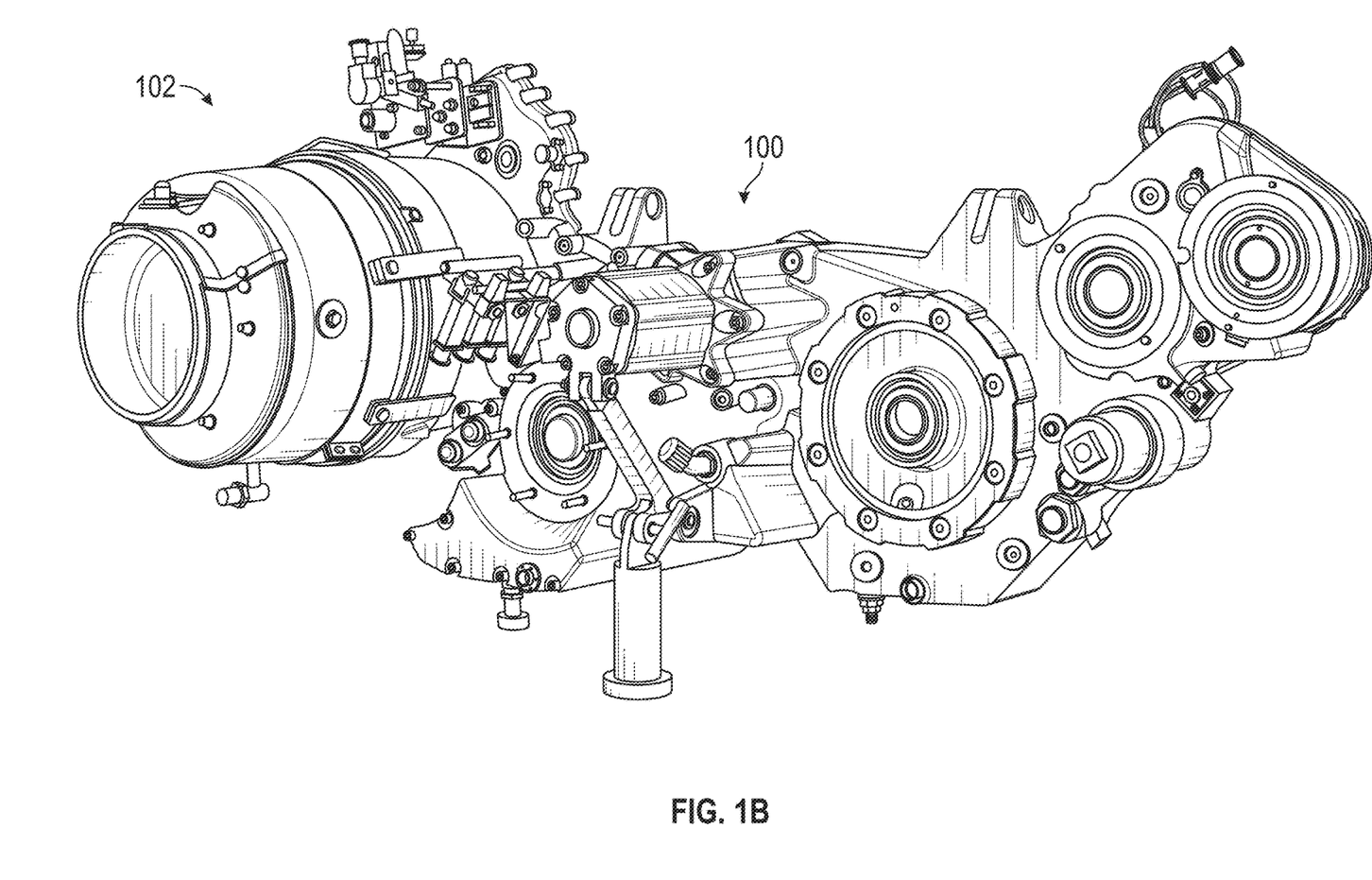
FIG. 1B is a perspective view of a starter assembly connected to a gear box.

FIG. 1B is a perspective view showing the gear box 100 connected to a starter assembly 102 of FIG. 1A. In one example, the starter assembly 102 may be an air turbine starter. Components of the gear box 100 may be arranged with components of the gas turbine engine 20 to transfer mechanical energy between the gas turbine engine 20 and the starter assembly 102 in either direction. While the starter assembly 102 is shown in communication with the gas turbine engine 20 in FIG. 1A, those in the art will appreciate that the starter assembly 102 may operate with other types of engines without departing from a scope of the present disclosure.

Figure 2A:
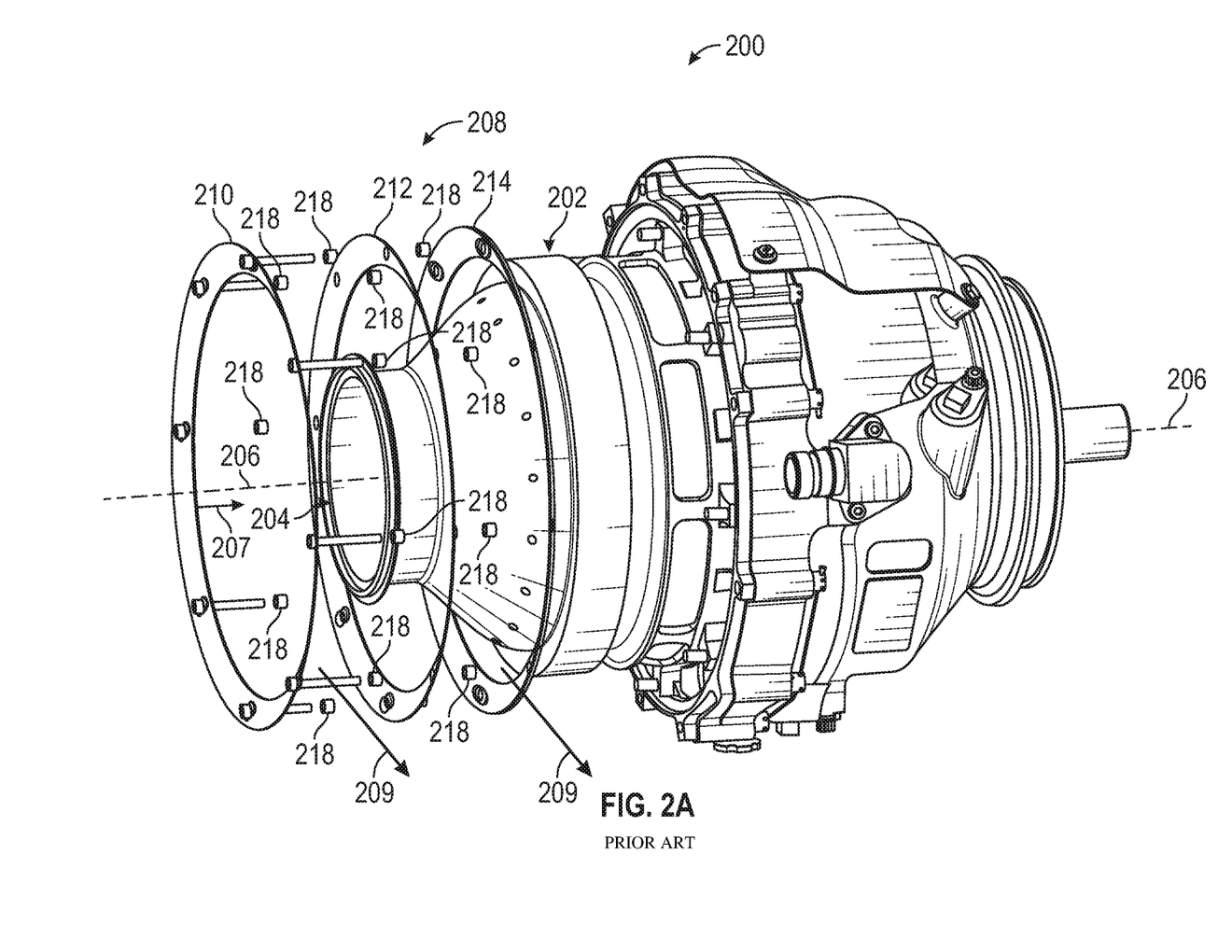
FIG. 2A is a perspective, partially exploded view of an example of a portion of a starter assembly of an engine.
Figure 2B:
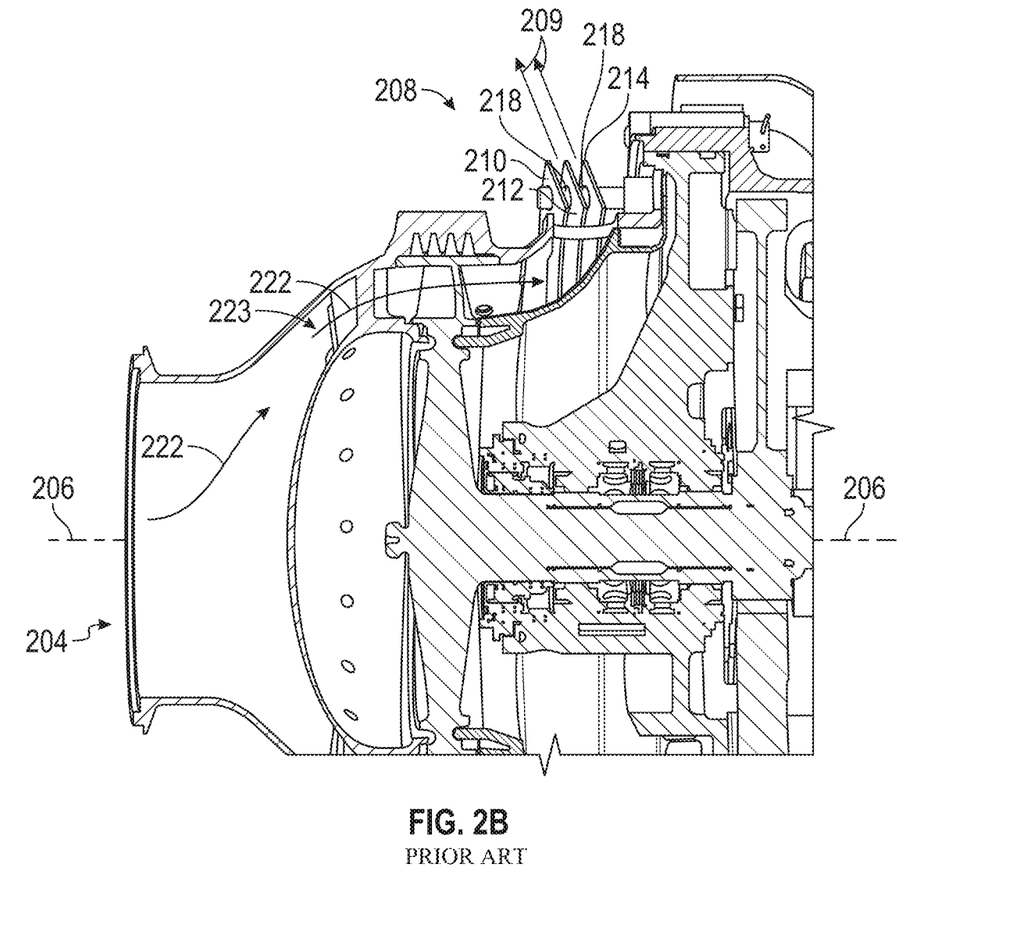
FIG. 2B is a side view, in cross-section, of a portion of the starter assembly of FIG. 2A.

FIGS. 2A and 2B show an example of a starter assembly of a gas turbine engine, referred to generally as a starter assembly 200 herein. In one example, the starter assembly 200 may be an air turbine starter. A housing 202 defines an opening 204. The opening 204 defines a central axis 206. Air enters the housing 202 via the opening 204 in a direction substantially parallel to the central axis 206 as represented by arrow 207 in FIG. 2A. Air exiting the housing 202 is represented by arrows 209 in 2B and exits through spacing between baffle louvers described below. Arrows 209 are also generally shown in FIG. 2A for context. The starter assembly 200 includes multiple additional components. For example, the starter assembly can include an exhaust baffle assembly 208. The exhaust baffle assembly 208 includes separately formed components such as a first baffle louver 210, a second baffle louver 212, a third baffle louver 214, and a plurality of spacers 218. Each of these separately formed components must then be assembled with one another, a burdensome task. While the exhaust baffle assembly 208 is shown with three baffle louvers in FIGS. 2A and 2B, those skilled in the art will appreciate that the exhaust baffle assembly 208 may include more than three baffle louvers.

FIG. 2B shows further detail related to an assembled version of the separately formed components discussed above. The assembly process alternately stacks the baffle louvers and the spacers 218. When assembled, the baffle louvers are oriented with one another in an overlap-fashion relative to airflow originating near the central axis 206 and traveling toward the baffle assembly 208 as represented by arrows 222 in FIG. 2B. For example, air may travel from the opening 204 to the baffle assembly 208 via a channel 223. When the air reaches the baffle assembly 208, the overlap-fashion of the baffle louvers interferes with continuous exhaust airflow through the baffle assembly 208 as all or most of the exhaust airflow contacts one of the first baffle louver 210, the second baffle louver 212, or the third baffle louver 214.

Figure 3A:
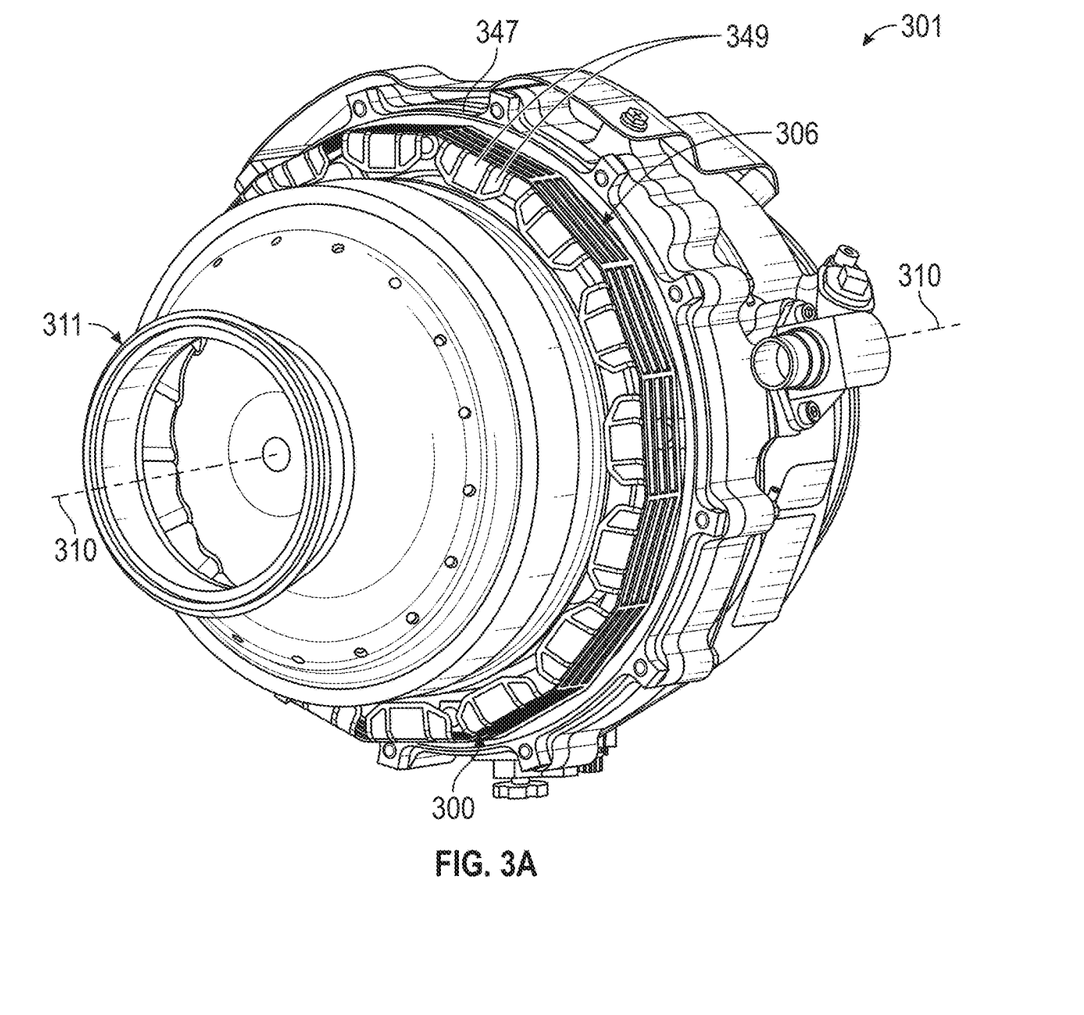
FIG. 3A is a perspective view of an example of a portion of a starter assembly of an engine.
Figure 3B:
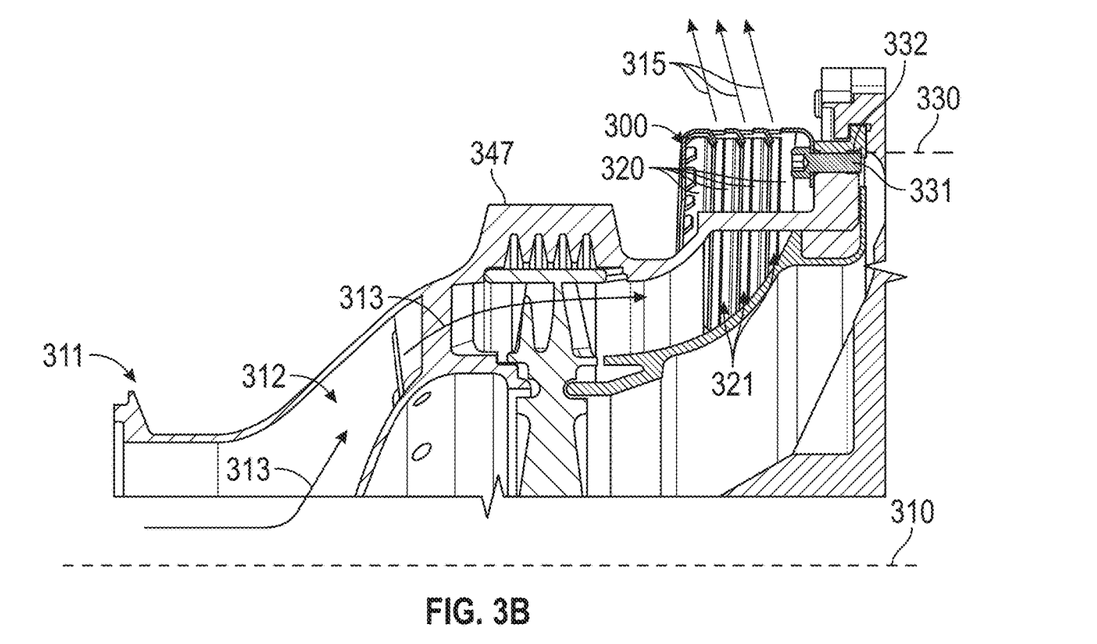
FIG. 3B is a side view, in cross-section, of a portion of the starter assembly of FIG. 3A.

FIGS. 3A and 3B illustrate an example of an engine starter assembly according to the present disclosure, referred to generally as an engine starter assembly 301 herein, and a portion of a baffle component for the engine starter assembly 301, referred to generally as a baffle component 300 herein. In one example, the engine starter assembly 301 may be an air turbine starter assembly. The engine starter assembly 301 and the baffle component 300 may be utilized in aircraft starters or other similar starters. For example, the starter assembly 301 may be coupled to a gear box in mechanical communication with an engine. The engine starter assembly 301 may be mounted adjacent to a portion of the engine, such as the gear box 100 described above in relation to the gas turbine engine 20. The baffle component 300 may include a plurality of frames 306 connected to one another or formed as a single component. Each frame 306 of the plurality of frames 306 may be concentric and generally spaced at equal distances from a starter assembly central axis 310. In one example, each frame 306 of the plurality of frames 306 may be arranged with one another to define a substantially circular shape about the starter assembly central axis 310. In another example, the starter assembly central axis 310 may be defined by an opening 311.

The baffle component 300 may be arranged with components of the engine starter assembly 301 to assist in managing airflow direction therein. Air may travel from the opening 311 to the baffle component 300 via an air channel 312 as represented with arrows 313 in FIG. 3B. Air may enter the starter assembly 301 at a location adjacent the starter assembly central axis 310 and travel in a direction parallel therewith as represented by arrow 313. Air may exit the starter assembly 301 via the baffle component 300 as represented by arrows 315 of FIG. 3B.

Figure 4A:
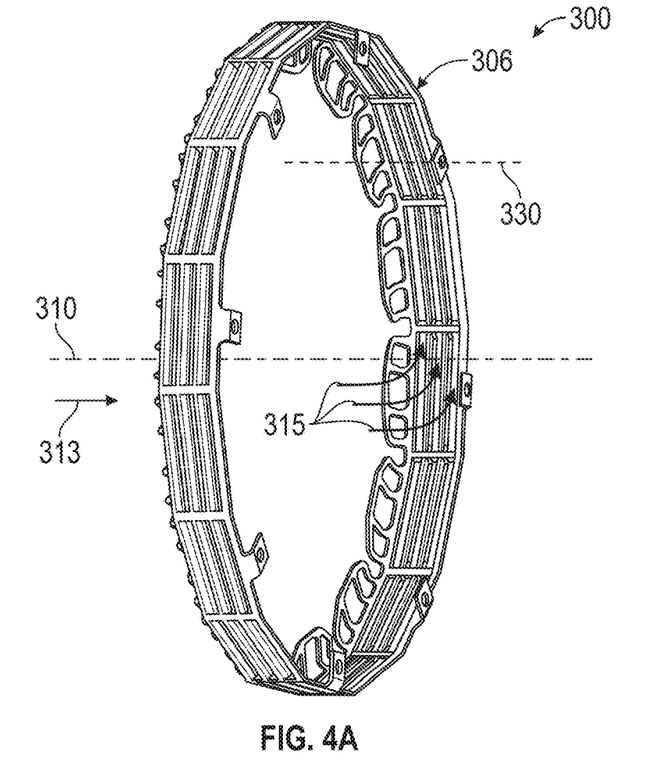
FIG. 4A is a perspective view of an exhaust baffle component of the starter assembly of FIG. 3A.
Figure 4B:
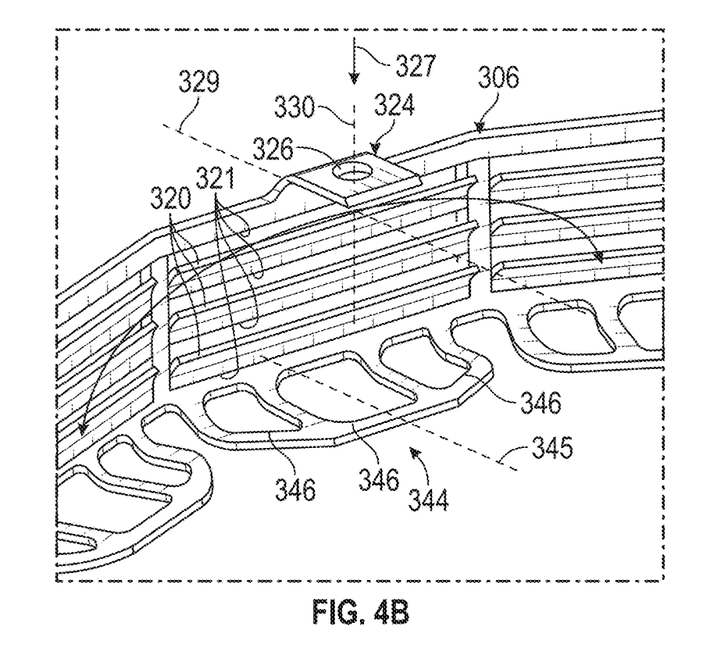
FIG. 4B is a perspective view of a portion of the exhaust baffle component of FIG. 4A.

Now additionally referring to FIGS. 4A and 4B, each frame 306 of the plurality of frames 306 may be formed to define at least one opening and include one or more louvers 320 extending across the opening to assist in directing airflow. Each louver 320 of the one or more louvers 320 may be spaced from one another and stacked to assist in facilitating airflow between the one or more louvers 320 as further described below in relation to FIG. 4C. Each louver 320 of the one or more louvers 320 may be stacked vertically relative to an upper axis defined by an upper portion of a respective frame 306 and arranged with one another to define openings 321 between each louver 320 for air to pass therethrough. In this example, the louvers 320 of the one or more louvers 320 are not arranged in an overlap-fashion.

While only one set of arrows 315 is shown in FIG. 4A representing airflow in relationship to one frame 306 of the plurality of frames 306, those skilled in the art will appreciate that the airflow in relationship to the other frames 306 of the plurality of frames 306 is similar.

Each frame 306 of the plurality of frames 306 may include features to assist in securing the baffle component 300 to a portion of a starter assembly for an engine. For example, at least one frame 306 of the plurality of frames 306 may include an attachment flange 324 extending from a central region of an upper portion of a respective frame 306. A second force may be created by the extension 344 (discussed below) acting on the starter housing 347. Each attachment flange 324 may extend along a flange axis 329.

Each attachment flange 324 may define an aperture 326 sized to receive a fastener, such as a fastener 331 shown in FIG. 3B. Each of the apertures 326 may be spaced at equal distances from the starter assembly central axis. Each frame 306 of the plurality of frames 306 may be arranged with a respective attachment flange 324 such that a first force 327 is created by a fastener inserted within a respective aperture 326. The first force 327 may be directed in a direction substantially perpendicular to a respective axis defined by an upper portion of the respective frame 306. Each attachment flange 324 may extend from a respective frame 306 such that each aperture 326 defines a centerline 330 oriented substantially parallel to the starter assembly central axis 310. Further, each attachment flange 324 may extend such that each centerline 330 is substantially aligned with a centerline of a starter component receiving aperture 332 as shown in FIG. 3B.

Each frame 306 of the plurality of frames 306 may include an extension 344 extending from a lower portion of a respective frame 306 along an extension axis 345. Each extension axis 345 may be oriented substantially parallel to a respective flange axis 329. Each extension 344 may define one or more openings 346. Each of the one or more openings 346 may be sized to receive a portion of a starter assembly, such as a feature 349 of a starter housing 347 shown in FIG. 3A.

Now with further reference to FIGS. 3A/3B and 4A/4B, in another example, each extension may be oriented to operate as a screen for airflow exiting the engine starter assembly 301.

Each extension 344 may extend in a direction substantially perpendicular to a respective centerline 330 to align each of the one or more openings 346 with desired features 349 of the starter housing 347. Each extension may extend in a direction substantially perpendicular to the starter assembly central axis 310. Each extension 344 may be of a flexible material to assist in facilitating a snap fit to the desired feature 349 of the starter housing 347 as seen in FIG. 4C.

Further, each attachment flange 324 may be arranged with a respective extension 344 such that a second force is created by the extension 344 acting on the starter housing 347. The second force may oppose the first force to assist in securing the baffle component 300 to the starter housing 347. Each attachment flange 324 may be arranged with a respective extension 344 such that each flange axis 329 is oriented in parallel with a respective extension axis 345.

Figure 4C:
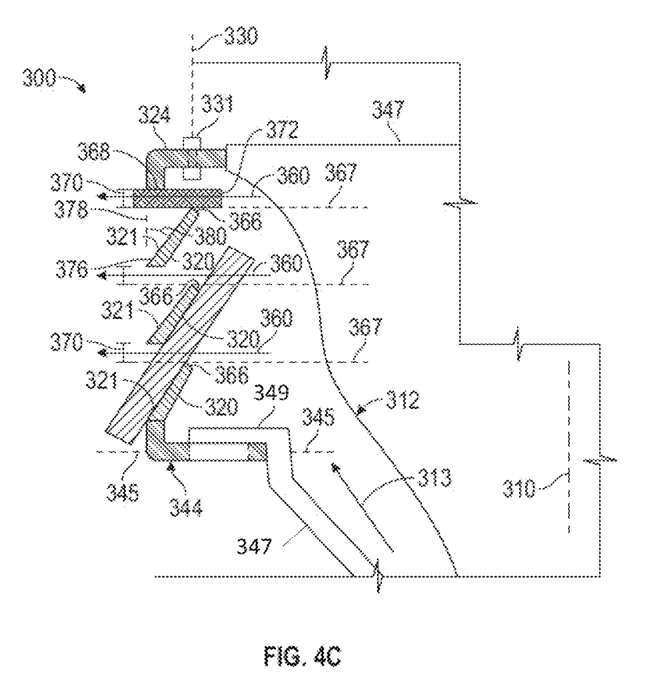
FIGS. 4C and 4D are side views, in cross-section, of a portion of the starter assembly of FIG. 3A illustrating an example of airflow influenced by the exhaust baffle component of FIG. 4A.

In comparison to the baffle assembly 208 shown in FIGS. 2A and 2B, the baffle component 300 may be formed as only one component (thus eliminating burdensome assembly processes), is structured to provide a more secure attachment to the starter housing 347 (due to a structure of respective attachment flanges 324 and respective extensions 344), and is structured to more efficiently assist in managing exhaust airflow as now described in relation to FIG. 4C.

Figure 4D:
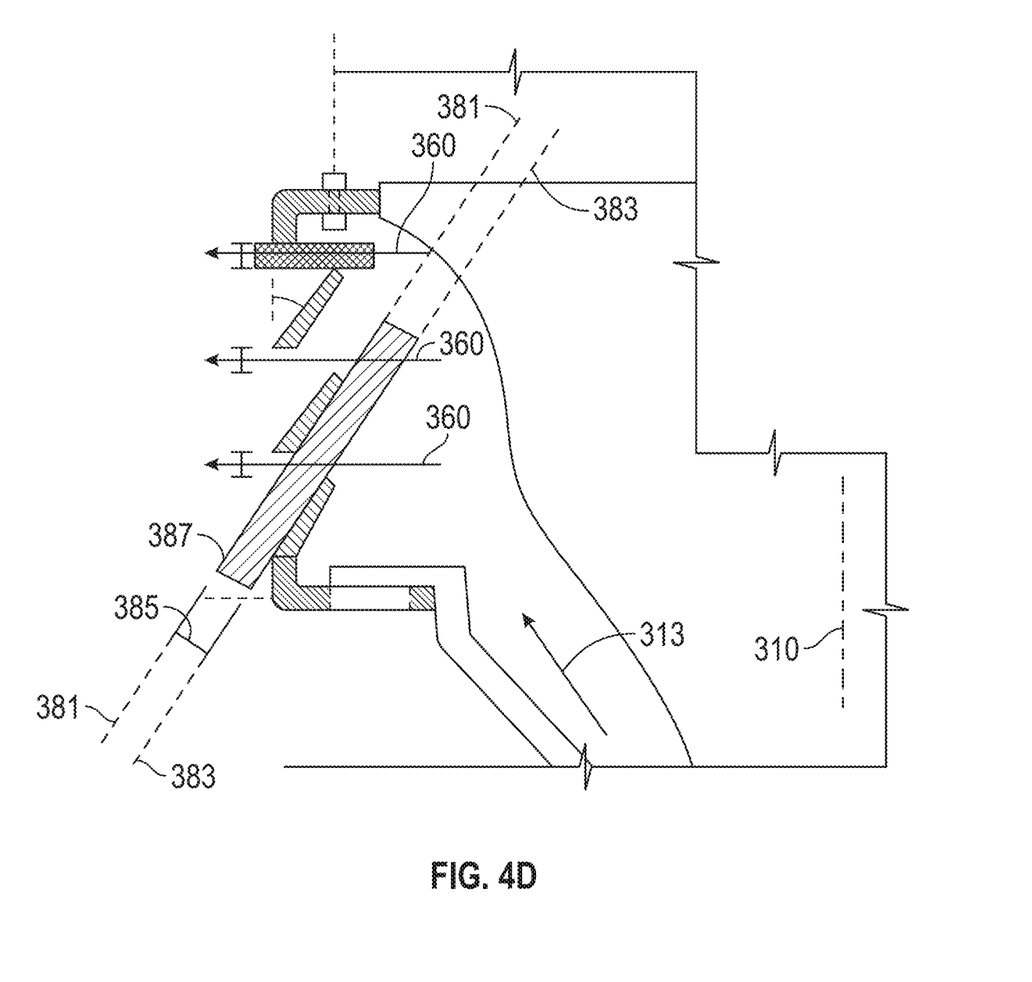

FIGS. 4C and 4D illustrate an example of fluid flow within a portion of the starter assembly 301 as influenced by the baffle component 300. These two FIGs. include the same view but reference numerals are split between them for clarity. As mentioned above, air originating at or adjacent the starter assembly central axis 310 may travel to the baffle component 300 via the air channel 312 as represented by arrows 313 in FIG. 3B and FIG. 4C. The air may then be exhausted from the starter assembly 301 as influenced by the baffle component 300 and as represented by arrows 360.

Each of the one or more louvers 320 may include a corner 366. Each axis of a plurality of exhaust axes 367 may extend perpendicularly from the starter assembly central axis 310 and intersect one of the corners 366. A spacing between an upper edge 368 of one of the openings 321 and a respective exhaust axis 367 defines a length 370. Each of the exhaust axes 367 and respective upper edges 368 may form upper and lower boundaries of a first continuous airflow region 372. The first continuous airflow region 372 may be defined as a region or airflow path in which air has a direct path from a location inside the starter assembly 301 to a location outside the starter assembly 301 with minimal or no contact with one of the louvers 320.

Each louver 320 of the one or more louvers 320 may be oriented at an angle to influence airflow. For example, an outer edge 376 of the baffle component 300 may define an edge axis 378. Each louver 320 of the one or more louvers 320 may be oriented at an angle 380 substantially between zero and ninety degrees relative to the edge axis 378. Each louver 320 of the one of more louvers 320 may be closed to block exhaust airflow directed towards certain adjacent engine components if desired. For example, when each louver 320 may be connected so that it can rotate about as axis and orientated at an angle of from zero to 90 degrees relative to the edge axis 378 if desired. Of course, such rotation is optional, and the louvers could be fixed. In another example and best shown in FIG. 4D, each louver 320 of the one or more louvers 320 may define a first louver axis 381 and a second louver axis 383. Adjacent louvers 320 of the one or more louvers 320 may be spaced from one another a distance 385. The louvers 320 of the one or more louvers 320 may be arranged with one another such that the louver axes and/or the distance 385 define a second continuous airflow region 387. The second continuous airflow region 387 may be defined as a region or airflow path in which air has a direct path from a location inside the starter assembly 301 to a location outside the starter assembly 301 with minimal or no contact with one of the louvers 320.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine starter assembly comprising:
    a turbine starter extending along a central axis;
    an exhaust baffle component connected to the turbine starter, the exhaust baffle component comprising:
    a plurality of frames arranged with one another as a single component,
    wherein each of the plurality of frames is connected to at least two adjacent frames of the plurality of frames to define a substantially circular shape about the central axis and to define a centerline that is parallel to the central axis;
    each of the plurality of frames includes:
    an upper portion and a lower portion that are spaced apart from each other along the central axis, wherein the upper portion of the frame includes two louvers stacked relative to one another and spaced from one another along the central axis to define an air opening therebetween, wherein each of the louvers extend, end to end, in a circumferential direction about the central axis;
    an attachment flange, extending along a flange axis from the upper portion toward the central axis to a radial inner end of the attachment flange, wherein the flange axis is perpendicular to the central axis, and wherein the attachment flange defines a receiving aperture oriented parallel to the central axis,
    wherein the receiving aperture is aligned with a starter aperture of a starter component of the turbine starter to facilitate securement of the attachment flange to the starter component; and
    an extension, configured to engage a housing of the starter component, extending from the lower portion of the frame along an extension axis that is parallel to the flange axis for the frame and extends toward the central axis to a radial inner end of the extension,
    wherein the extension defines openings that are adjacent to each other and to the lower portion of the frame;
    wherein each frame defines a U-shaped profile including the attachment flange and the extension flange.

2. The assembly of claim 1, for at least one of the frames, a fastener inserted within the receiving aperture that secures the attachment flange to the starter component.

3. The assembly of claim 1, wherein the two louvers in each frame are stacked along the central axis.

4. An exhaust baffle for a turbine starter assembly, the baffle comprising:
    a plurality of segments circumferentially distributed, one after the other, to form an annulus about a central axis,
    wherein each of the segments extends from a first axial end to a second axial end and from a first circumferential end to a second circumferential end, and wherein each of the segments includes:
        louver slats that extend from the first circumferential end to the second circumferential end, are circumferentially a same length as each other, and are axially offset from each other between the first and second axial ends to define airflow passages;
        an attachment flange, that is connected to the first axial end of the segment, is located at a circumferential center of the segment, extends radially toward the central axis to a first radial inner tip of the attachment flange, and defines a receiving aperture; and
        an extension member, that is connected to the second axial end of the segment, extends to the first and second circumferential ends of the segment, and extends radially toward the central axis to a second radial inner tip of the extension member, wherein the extension member defines a plurality of apertures that are adjacent to each other and to the second axial end of the segment;

wherein each of the segments defines a U-shaped profile from the first radial inner tip to the second radial inner tip.

5. The baffle of claim 4, wherein the plurality of apertures of the extension member are circumferentially distributed.

6. A turbine starter assembly comprising:
the exhaust baffle of claim 4 connected to a turbine starter extending along the central axis.

7. The assembly of claim 6, wherein the receiving aperture of each segment of the baffle is aligned with a respective starter aperture of the turbine starter for securing the respective attachment flange to the turbine starter.

\* \* \* \* \*